INVENTORS.
KARL A. NORTHRUP
LARRY H. WARREN
LAWRENCE A. FERGUSON

ATTORNEYS

INVENTORS.
KARL A. NORTHRUP
LARRY H. WARREN
LAWRENCE A. FERGUSON

BY

ATTORNEYS

United States Patent Office 3,330,180
Patented July 11, 1967

3,330,180
ILLUMINATION CONTROL SYSTEM
Lawrence A. Ferguson, West Webster, Karl A. Northrup, Rochester, and Larry H. Warren, East Rochester, N.Y., assignors to Xerox Corporation, Rochester, N.Y., a corporation of New York
Filed Oct. 14, 1964, Ser. No. 403,889
6 Claims. (Cl. 88—24)

This invention relates generally to the field of illumination and, in particular, to a system for controlling illumination of a document during scanning thereof in a reproduction device such as a xerographic reproducing apparatus.

The circuit for illuminating the document during scanning thereof is particularly adapted for use with xerographic apparatus such as that disclosed in the copending application, Ser. No. 400,363, filed Sept. 30, 1964 in the name of Robert F. Osborne et al. In that apparatus, copies of original documents are made at very high speeds and for many intervals throughout a working day. With apparatus that is repeatedly in use and is primarily utilized to reproduce a relatively high number of copies, it is desirable that the machine be in optimum condition for immediate use and to remain in optimum condition throughout the working periods.

In the present invention, a particular circuit arrangement is devised for energizing the illumination lamps of an office copier or reproduction apparatus of the type employing the principles of xerography. The lamps may be of the conventional fluorescent type for illuminating a document during scanning thereof by a suitable optical system. The light rays emanating from the document during scanning are projected by an optical system onto the surface of a xerographic plate. In order to provide as much light as possible for this purpose because of the short exposure times involved with high speed reproduction, the circuit for the present invention is designed to control preheating as one function in operation and, to control the heating and cooling as another function and thereby provide optimum lumen output of the lamps during the entire scanning period of a document.

In addition, to minimize the time for conditioning the xerographic apparatus for scanning purposes, the circuit arrangement is devised so that the lamps are initially preheated to near optimum operating temperature at the instant that they are electrically energized. In this manner, with the lamps preheated before energization thereby, the time lag that usually prevails before the illumination lamps achieve their maximum lumen output is minimized. The circuit also includes means for controlling the temperature of the lamps during use thereof in order to maintain the optimum temperature during use.

Therefore, it is the principal object of the present invention to control the temperature of the exposure lamps in a reproduction apparatus so that optimum lighting is achieved for the illumination of a document being reproduced.

Another object of the invention is to produce optimum lighting conditions in a reproduction apparatus in a minimum of time thereby permitting use of apparatus in a minimum of time and without loss of illumination efficiency during the early stages of each reproduction run.

For a better understanding of the invention, as well as other objects and further features thereof, reference is had to the following detailed description of the invention to be read in connection with the accompanying drawings, wherein.

Figure 1:
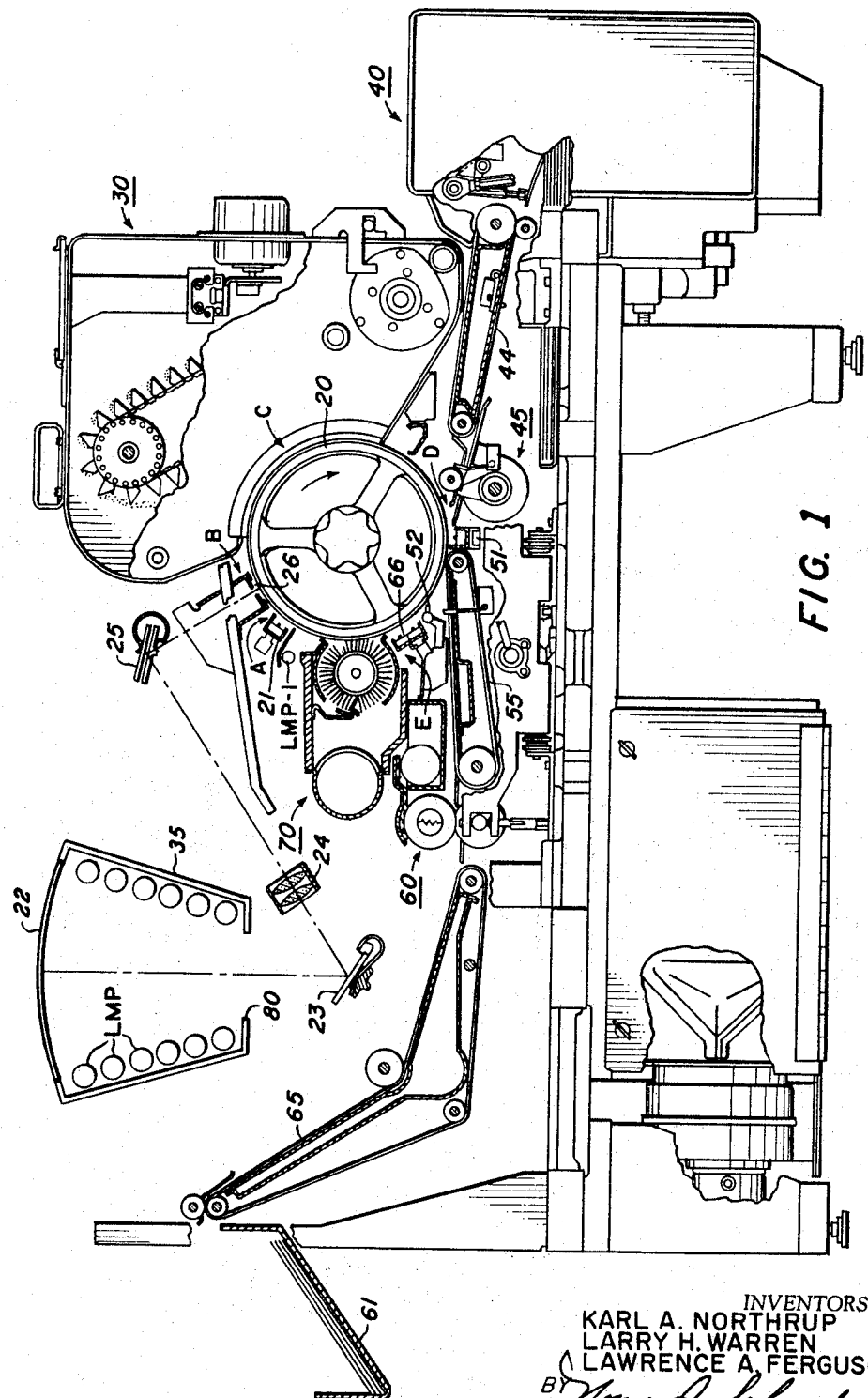
FIG. 1 is a schematic illustration of an apparatus employing the invention.

As shown schematically in FIG. 1 the xerographic reproducing apparatus that is particularly adapted to utilize the present invention comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, located at A, at which a uniform electrostatic charge is deposited on the photoconductive layer of the xerographic drum by a corona charging device 21;

An exposure station, located at B, at which a light or radiation pattern of copy to be reproduced is projected by an optical scanning device onto the drum surface to dissipate the drum charge in the exposed areas thereof and thereby form a latent electrostatic image of the copy to be reproduced;

The optical scanning device comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projected relation to the moving light-receiving surface of the xerographic drum. Uniform lighting is provided by banks of lamps LMP arranged on opposite sides of the copyboard and enclosed in a lamp housing 35. A separate circuit (not shown) for energizing the lamps is provided. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a shot in a fixed light shield 26 positioned adjacent to the xerographic drum surface.

A developing station, located at C, at which a xerographic developing material including toner particles having an electrostatic charge opposite to that of the electrostatic latent image are cascaded over the drum surface by a developer apparatus 30 whereby the toner particles adhere to the electrostatic latent image to form a xerographic powdered image in the configuration of the copy being reproduced;

Positioned next and adjacent to the developing station is the image transfer station D which includes a sheet feeding arrangement 40 adapted to feed sheets of support material, such as paper or the like, successively to the xerographic drum in coordination with the presentation of the developed image on the drum surface at the transfer station.

The sheet feeding mechanism cooperates with the belts of a paper transport 44 for advancing the sheet sufficiently to be held by the paper transport 44 which in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum. The transfer of the xerographic powder image from the drum surface to the sheets of support material is effected by means of a corona transfer device 51 that is located at or immediately after the line of contact between the support material and the rotating drum.

Immediately subsequent to the image transfer station, there is positioned a stripping apparatus 52 of the type disclosed in the patent to Rutkus et al., Patent No. 3,062,-536, for removing the sheets of support material from the drum surface. The mechanism 52 is adapted to strip the leading edge of the sheet from the drum surface and to direct it onto an endless conveyor 55 whereby the sheet material is carried to a fixing device 60. At the fixing device, the transferred xerographic powder image on the sheet of support material is permanently fixed or fused thereto as by heat. After fusing, the reproduction is discharged from the apparatus at a receiving tray 61 externally of the apparatus by means of the conveyor 65.

The next and final station in the device is a drum cleaning station E, having positioned therein a corona preclean device 66, a drum cleaning device 70 adapted to remove any powder remaining on the xerographic drum and a discharge lamp LMP-1 adapted to flood the xerographic drum with light to cause dissipation of any residual electrical charge remaining on the xerographic drum.

Suitable drive means are provided to drive the drum, rotating mirror and sheet feed mechanism at predetermined speeds relative to each other, and to effect operation of the bucket-type conveyor and toner dispenser mechanism and the other operating mechanisms.

The exposure mechanism is used to scan the object to be reproduced and to project a flowing image thereof onto the rotating xerographic drum. The scanning of the object, such as a document or book, placed on a copy platen is accomplished by means of an oscillating object mirror which reflects an image from the object through a lens onto an image mirror which, in turn, reflects the image through a slotted light shield 80 formed in the lower wall of the lamp housing 35, onto the xerographic drum.

The platen 22, made of transparent material, such as glass, is suitably attached to the frame for the apparatus directly over the axis of rotation of the object mirror 23. The platen 22 is curved in the shape of an arc, with the radius thereof equal to the distance from the platen surface to the axis of rotation of the object mirror 23. A suitable platen cover may be pivotally arranged in position to cover the platen 22 and to force a document into intimate contact with the platen. A document or other object to be reproduced placed on the curved platen 22 is uniformly illuminated by banks of lights, identified as fluorescent lamps LMP mounted in conventional fluorescent lamp holders secured in the housing 35 and energized by a suitable source of electrical power.

Figure 3:
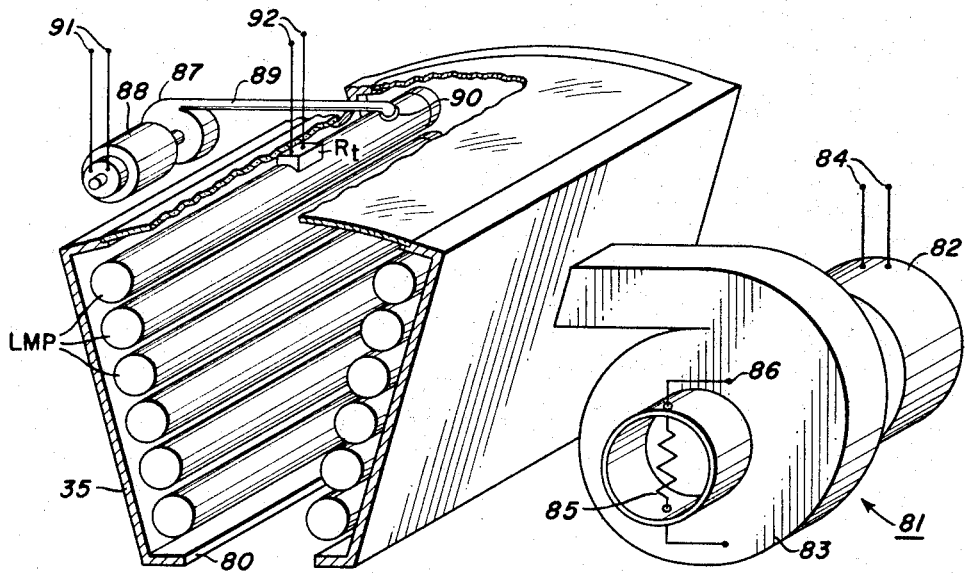
FIG. 3 is a schematic illustration of the lamp housing of the apparatus of FIG. 1, showing details in their cooperative relationship.

In FIG. 3 the lamp housing 35 is shown associated with a blower 81 and motor 82 therefor encased in a suitable housing 83 in communication with the lamp housing interior. The motor 82 is provided with suitable terminals 84 for connection to a source of electrical power, as will be described hereinafter. Mounted in heat transfer relationship with the blower 81 is a resistance heater element 85 having terminals 86 for connection to a source of electrical power independent of the electrical connection to the motor 82. The connection between the blower housing 83 and the lamp housing 35 may be of any suitable type that will permit the movement of air through the blower 81 and into the lamp housing 35 for circulating air around the lamps and the platen 22, such for example, a metallic duct or a manifold. In any event the blower 81 is arranged to produce and maintain air flow into the lamp housing 35.

A second blower 87 is also in communication with the interior of the lamp housing 35, however, the flow of air produced by this blower is directed specifically to designated points on the lamps. The housing for the blower 87 is connected by a tubing 89 through a suitable aperture in the wall of the lamp housing and upon a small area 90 on each of the lamps LMP in the lamp housing. These areas, when cooled below the temperature of the lamps while energized, condense mercury vapor and cause deposition of mercury on these cool spots. For purposes of simplicity, the term "mercury spots" will be utilized through this specification to designate these areas.

In FIG. 3, for purposes of simplicity, only one lamp is shown and only one tubing is connected to the blower housing 88. In actual practice each of the lamps would have its own tubing which may be connected to a manifold and connected to the blower housing 88. Any other arrangement may be devised for conveying air to the areas on the lamps. The area being cooled may be located anywhere on a lamp or be of any size, depending upon the efficiency desired for the cooling system. The motor 88 for the blower 87 is provided with suitable terminals 91 for connection to a source of electrical power.

In thermal contact with the spot 90 on one of the lamps in the lamp housing 35 is a thermistor $R_t$ which is connected to a circuit to be described hereinafter for controlling energization of the blower motor 88. In order to simplify the illustration in FIG. 3, the thermistor is shown at another point along one of the lamps. Actually, the thermistor is positioned in thermal contact with the spot 90. Suitable terminals 92 are provided on the thermistor for connection to this circuit.

Figure 2:
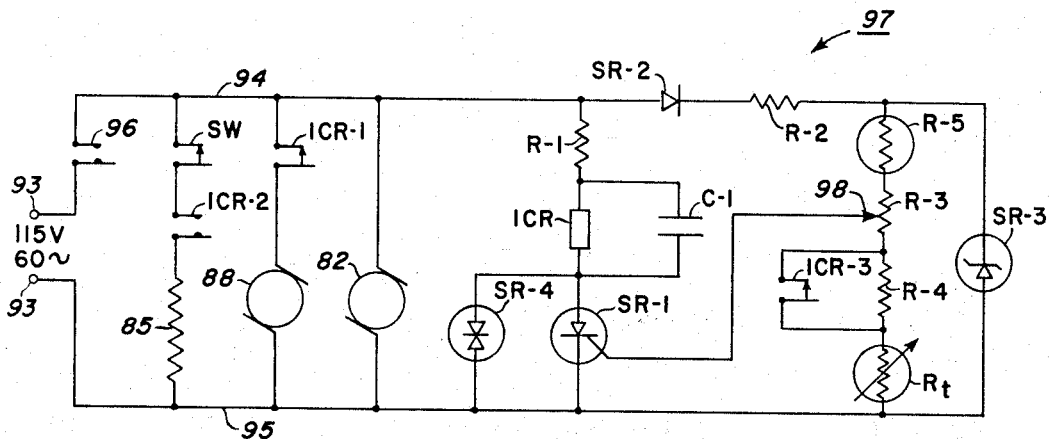
FIG. 2 is a schematic electrical circuit wiring diagram of the present invention.

The circuit of FIG. 2 is arranged to provide electrical power to the motor 82 when the apparatus of FIG. 1 is in its "ON" condition; to provide energization for the heater element 85 during certain periods of energization of the motor 82 and; to provide energization for the motor 88 for the blower 87 to control temperature of the spot 90, as sensed by the thermistor $R_t$. To this end the circuit is connected by terminals 93 to a suitable source of electrical power of 115 volts at 60 cycles. Electrical energy is thereby available at the power conductors 94 and 95. A main switch 96 is located in the conductor 94 for controlling the power supply to the circuit and preferably is arranged to be closed when the reproduction apparatus, such as the xerographic machine illustrated in FIG. 1, is switched to its "ON" condition and before running operation thereof commences.

The motor 82 for the blower 81 is connected between the power conductors 94, 95 for connection to the source of electrical energy when the main switch 96 is closed. This provides a continuous flow of air from the blower 81 to the lamp housing 35 when the reproduction apparatus is initially turned "ON." The blower 81 remains in continuous operation during the time that the xerographic machine is in operation in order to cool the platen 22 and prevent excessive heat from developing thereat. The blower motor 88 for the blower 87 is also connected between the conductors 94, 95, however, a normally closed relay contact 1CR-1 is interposed in this motor circuit in order to control energization thereof for reasons to be discussed hereinafter. The resistance heater element 85 is also connected between the power conductors 94, 95 but is provided with a normally open relay contact 1CR-2 and a second switch SW, normally closed in series with the contact 1CR-2 and the heater element 85. The switch SW may be associated with the electrical circuit for the reproduction apparatus and be actuable to an open condition when the apparatus is placed in run condition. In this manner when the machine is in running condition the heater element 85 is deenergized.

The power conductors 94, 95 are connected to a temperature control circuit generally indicated by the reference numeral 97. Connected between the power conductors is a relay coil 1CR in series with a silicon controlled rectifier SR-1. The relay coil 1CR is associated with the relay contacts 1CR-1 and 1CR-2 and when energized, the contact 1CR-1 opens the circuit to the motor 87 and closes the contact 1CR-2 to close the circuit to the heater element 85. A suitable capacitor C-1 is shunted across the relay coil 1CR and a resistor R-1 is in series with the capacitor to provide a time constant for the relay. At the junction of the relay coil and the rectifier SR-1, one side of a thyrector diode SR-4 is connected with the other side thereof connected to the power conductor 95. The thyrector serves to suppress transients that may occur and which may adversely affect the rectifier SR-1.

Also connected between the power conductors 94, 95 are the terminals 92 of the thermistor $R_t$ which has in series therewith the resistance component of a potentiometer R-3, a fixed resistor R-4 and a positive temperature coefficient resistor R-5 which serves to provide compensation for changes in the gate voltage for the rectifier SR-1 due to ambient temperature changes. A normally closed relay contact 1CR-3 is connected across the resistor R-4 for normally shorting this resistor when the relay 1CR is deenergized.

The energization of the relay coil 1CR, in effect is under the control of the thermistor $R_t$ and to this end the gate electrode for the silicon controlled rectifier SR-1 is connected to the wiper arm 98 for the potentiometer R-3. When the voltage on the wiper arm 98 is at a required level, as determined by the sum of the resistances in the thermistor $R_t$, and that portion of the resistance component R-3 between the wiper arm and the thermistor, the gate electrode will produce conduction in the rectifier SR-1. This conduction will cause energization of the relay 1CR to effect closing of the contact 1CR-2 and opening of the contact 1CR-1.

To complete the temperature control circuit 97, a zener diode SR-3 is connected between the conductors 94, 95 for maintaining a threshold or a reference voltage in the circuit. A diode SR-2 is connected in the conductor 94 between the resistor R-5 and the main switch 96 for providing a D.C. potential to the circuit and is in series with a resistor R-2.

In operation, it is assumed that the xerographic apparatus of FIG. 1 is in the "OFF" condition and no power is applied to the illumination lamps LMP. When the operator turns the apparatus "ON," either directly or indirectly, the switch 96 should be actuated to a closed condition for energizing the motor 82 and to produce air flow through the interior of the lamp housing 35. As will be described hereinafter, with the closing of the switch 96, the heater element 85 will be energized through the relay contact 1CR-2 which is normally open but since the lamps are cool will close when power is supplied to the circuit 97. This will result in the heating of the chamber of the lamp housing 35 and, consequently, each of the lamps LMP. The thermal output of the heater element working in conjunction with the blower 81 should be sufficient to heat the lamps externally to a temperature near or at the temperature such that the mercury spots reach the required temperature for optimum lumen output efficiency. Generally, fluorescent lamps do not reach their maximum lumen output until after a short time lag when the temperature builds up to a value producing optimum mercury vapor pressure thereby producing maximum output. When the lamps are utilized for exposing light sensitive surface, this light output variation will result in uneven exposure during a scanning cycle. By preheating the chamber in the light housing 35, before the lamps are energized and before scanning of a document is initiated, the lamps will operate at maximum output almost immediately after they are energized since they will be at or near the temperature at which maximum output is available. In this manner, light output variation is reduced considerably. These variations for successive operations of the machine would result in a loss of illumination at the initial stage of scanning of each document and the corresponding loss of imaging on the xerographic drum 20.

After reaching the operating temperature, there is provided means for maintaining this operating temperature as another function of the present invention. For these particular types of lamps, as the temperature increases beyond an optimum temperature, the lumen output decreases. This condition is related to the mercury vapor pressure in the lamp because as the temperature increases due to continuous operation, the vapor pressure increases beyond the optimum level, thereby causing a drop in light output.

The mechanism illustrated in FIG. 3 and the circuit of FIG. 2 are particularly adapted to control the temperature of the lamps and thereby the mercury vapor pressure in order to minimize or eliminate the adverse effect produced when these lamps operate in an over or under temperature condition. By controlling the flow of cool air over the spot or area 90, the mercury vapor pressure in each lamp may be controlled. As the spot is cooled, some of the mercury vapor condenses to lessen the vapor pressure in the lamp and thereby cause an increase in the lumen output. The temperature of the lamps is maintained under control by the circuit 97 as sensed by the thermistor $R_t$.

The xerographic apparatus is now in "Standby" condition and needs only further action from the operator to commence running of the machine. This action generally takes the form of closing a manually actuable "Print" switch to produce energization of the lamps LMP through their own external circuit; scanning of the document; the actuation of the other moving structures in the machine and; the opening of the switch SW for terminating energization of the heater 85 and preheating of the lamps during running of the machine. The circuit of FIG. 2 has at this time or, just immediately prior to energization of and scanning by the lamps, produced preheating of the lamps to condition them for immediate optimum efficiency.

When the xerographic apparatus commences running, the lamps LMP may be cooler than optimum temperature conditions. In this case, the thermistor $R_t$, when sensing the lamps that are cooler than optimum temperature will exhibit a high resistance which when added to the portion of the potentiometer resistance in series therewith, will produce a relatively high voltage level upon the gate electrode of the rectifier SR-1. This level will be sufficient to produce conduction of the rectifier. In this condition of the circuit, the normally closed contact 1CR-1 will be opened to prevent energization of the blower motor 88 and the lamps will develop more heat due to its normal operation. As the temperature of the lamps increases, the resistance in the thermistor will decrease and, when the desired temperature at which maximum lumen output results is attained, the resistance in the thermistor will be at that value to terminate conduction in the rectifier SR-1. With this rectifier in a non-conducting state, the relay coil 1CR will be deenergized to permit closing of the contact 1CR-1. This closure will energize the blower motor 88 and cause a flow of cool air to impinge upon the spot 90. This action will continue until the temperature of the lamps decreases to the desired value where the relay 1CR becomes energized and the flow of cool air is terminated. The desired temperature to be maintained may be varied by manipulation of the wiper arm 98 since the resistance of the potentiometer that is connected to the thermistor aids in the development of the triggering level for the gate electrode in the rectifier SR-1.

In the event that the time between turning the machine "ON" and before it commences running is lengthy or sufficient to cause the heater 85 to produce the desired temperature, the contact 1CR-2 will open and the contact 1CR-1 will close while the switch SW is still closed. This will occur because the relay 1CR will be energized by the reusing of the thermistor $R_t$ upon the spot 90 at the desired temperature. This action will deenergize the heater 85 and energize the cooling blower 87. The energization of the heater 85 and the deenergization of the blower 87 will again take place when the temperature of the lamp falls below the desired temperature. This action or cycling of the heating and cooling of the lamps will maintain the desired temperature throughout the stand-by condition of the machine.

If desired, the switch SW may be eliminated thus providing the above-described heating and cooling cycles throughout the entire operation of the machine.

The energization of the relay coil 1CR also activates the contact 1CR-3 which, when open, adds the resistor R-4 having a very low resistance value, to the effective resistances of the thermistor $R_t$ and potentiometer R-3. When the resistance in the thermistor increases sufficiently to cause relay operation and cooling of the spot 90, the relay immediately adds more resistance in series with the thermistor to increase the gate voltage to a value slightly above the triggering voltage. This arrangement will increase to a very slight extent, the temperature range that the lamps can experience before the relay becomes energized or deenergized, as the case may be and thereby minimize chattering of the relay 1CR.

From the foregoing description of the lamp control circuit, it will be understood that the temperature conditions for the illumination lamps are affected in two integrated ways to provide an illumination system that is most advantageous as the light source in a reproduction apparatus. In one aspect, the lamps are preheated before scanning takes place or when the apparatus is in a stand-by condition. This results in uniform light distribution throughout the entire scanning function. In the second aspect, and for repeated scans, the effective temperature of the lamps is maintained at a desired temperature or that temperature which will result in the maximum lumen output of the lamps.

While the invention has been described with reference to the circuit arrangement and structure disclosed herein, it is not confined to the details set forth, and this application is intended to cover such modifications or changes as may come within the purpose or the scope of the appended claims.

What is claimed is:

1. In an illumination system for a reproduction apparatus having at least one lamp for illuminating documents during scanning thereof and means for projecting the image rays therefrom upon a light sensitive surface:
   means defining a chamber for enclosing the lamp,
   first blower means for conveying air into said chamber,
   means for heating the air being conveyed before the commencement of the scanning of the document,
   second blower means arranged to convey air to and upon a predetermined area on the lamp for cooling the lamps thereby,
   and a temperature response device associated with said second blower means and the lamp for activating said second blower when the temperature of the lamp exceeds a predetermined value.

2. In an illumination system for a reproduction apparatus having at least one lamp for illuminating documents during scanning thereof and means for projecting the image rays therefrom upon a light sensitive surface:
   means defining a chamber for enclosing the lamp,
   first blower means for conveying air into said chamber,
   means for heating the air being conveyed before the commencement of the scanning of the document,
   second blower means arranged to convey air to and upon a predetermined area on the lamp for cooling the lamps thereby,
   and control means associated with said second blower means and the lamp for activating said second blower when the temperature of the lamp exceeds a predetermined value.

3. In an illumination system for a reproduction apparatus having at least one lamp for illuminating documents during scanning thereof and means for projecting the image rays therefrom upon a light sensitive surface:
   means defining a chamber for enclosing the lamp,
   first blower means for conveying air into said chamber,
   means for heating the air when said lamp is below a predetermined temperature,
   second blower means arranged to convey air to and upon a predetermined area on the lamp for cooling the lamps thereby,
   and a temperature response device associated with said lamp for activating said second blower when the temperature of the lamp exceeds a predetermined value.

4. In an illumination system for a reproduction apparatus having at least one lamp for scanning documents and means for projecting the image rays therefrom upon a light sensitive surface:
   means defining a chamber for enclosing the lamp,
   a blower in communication with said chamber and including a motor for conveying air into the chamber when said motor is energized,
   means for continuously energizing said motor when the apparatus is in running condition,
   a heater element associated with said blower and arranged, when energized, to heat the air being conveyed for heating the lamp in said chamber,
   a circuit connected to a source of electric current and arranged to energize said heater element,
   said circuit including a normally open switch means connected between said source and said heater element and adapted to be actuated to a closed position for causing energization of said heater for energizing the heater element independently of the energization of said motor and,
   means for actuating said switch means to said closed position before the apparatus is in running condition and when said motor is energized.

5. In an illumination system for a reproduction apparatus having at least one lamp for scanning documents and means for projecting the image rays therefrom upon a light sensitive surface:
   means defining a chamber for enclosing the lamp,
   a blower in communication with said chamber and including a motor for conveying air into the chamber when said motor is energized,
   means for continuously energizing said motor when the apparatus is in running condition,
   a heater element associated with said blower and arranged, when energized, to heat the air being conveyed for heating the lamp in said chamber,
   a circuit connected to a source of electric current and arranged to energize said heater element,
   said circuit including a normally open switch means connected between said source and said heater element and adapted to be actuated to a closed position for causing energization of said heater for energizing the heater element independently of the energization of said motor and,
   means response to the temperature of the lamp for actuating said switch means to said closed position when the temperature is below a predetermined value.

6. In an illumination system for a reproduction apparatus having at least one lamp for scanning documents and means for projecting the image rays therefrom upon a light sensitive surface:
   means defining a chamber for enclosing the lamp,
   a first blower in communication with said chamber and including a motor for conveying air into the chamber when said motor is energized,
   means for continuously energizing said motor when the apparatus is in running condition,
   a heater element associated with said blower and arranged, when energized, to heat the air being conveyed for heating the lamp in said chamber, a circuit connected to a source of electric current and arranged to energize said heater element, a second blower arranged to direct to a portion of the lamp for cooling the same, said circuit including a normally open switch means connected between said source and said heater element and adapted to be actuated to a closed position for causing energization of said heater for energizing the heater element independently of the energization of said motor and, means responsive to the temperature of the lamp for actuating said switch means to said closed position when the temperature is below a predetermined value and to activate said second blower when the temperature of the lamp is above the predetermined temperature.

References Cited

UNITED STATES PATENTS

| | | | |
|---|---|---|---|
| 2,610,289 | 9/1952 | Brainerd. | |
| 3,103,156 | 9/1963 | Quin | 240—47 |
| 3,112,890 | 12/1963 | Snelling | 240—47 X |

NORTON ANSHER, *Primary Examiner.*

R. A. WINTERCORN, *Assistant Examiner.*